United States Patent [19]

Hyde, Jr.

[11] 4,414,922
[45] Nov. 15, 1983

[54] BIRD FEEDER
[75] Inventor: Donald B. Hyde, Jr., Stow, Mass.
[73] Assignee: Hyde's Incorporated, Waltham, Mass.
[21] Appl. No.: 376,526
[22] Filed: May 10, 1982
[51] Int. Cl.³ .............................................. A01K 39/01
[52] U.S. Cl. ................................................ 119/51 R
[58] Field of Search ...................... 119/51 R, 52 R, 70
[56] References Cited
U.S. PATENT DOCUMENTS
3,568,641 3/1971 Kilham ............................. 119/51 R
4,026,244 5/1977 Salick ................................ 119/51 R Primary Examiner—Hugh R. Chamblee
Attorney, Agent, or Firm—Thompson, Birch

[57] ABSTRACT

A bird feeder has a seed storage compartment at least partially defined by a side wall. Improved feeding ports are provided in the side wall through which birds may extract seeds from the storage compartment. Each feeding port comprises an opening in the side wall which is partially occluded by one or more resilient finger members. The finger members are arranged to prevent a free flowing escape of seeds from the storage compartment, and are flexible to accommodate forcible extraction of seeds from therebetween.

8 Claims, 7 Drawing Figures

BIRD FEEDER

BACKGROUND OF THE INVENTION

This invention relates to bird feeders of the type having upstanding side walls with feeding ports therein through which seeds may be extracted from interior storage compartments. Although numerous types of such feeders have been developed and placed on the market, to date, none have satisfactorily dealt with the problem of providing feeding ports which not only afford birds with easy access to seeds in the storage compartments, but which also effectively prevent the free flowing escape and loss of seeds through the feeding ports during times when birds are not feeding.

SUMMARY OF THE PRESENT INVENTION

A primary objective of the present invention is the provision of a bird feeder having improved feeding ports which obviate the above-stated problem. Further objectives of the present invention include the provision of a bird feeder with improved feeding ports which are simple in design, relatively inexpensive and easily mass produced.

These and other objects and advantages of the present invention will be described hereinafter with reference to the accompanying drawings, wherein:

DETAILED DESCRIPTION OF INVENTION

Figures 1, 2, 3:
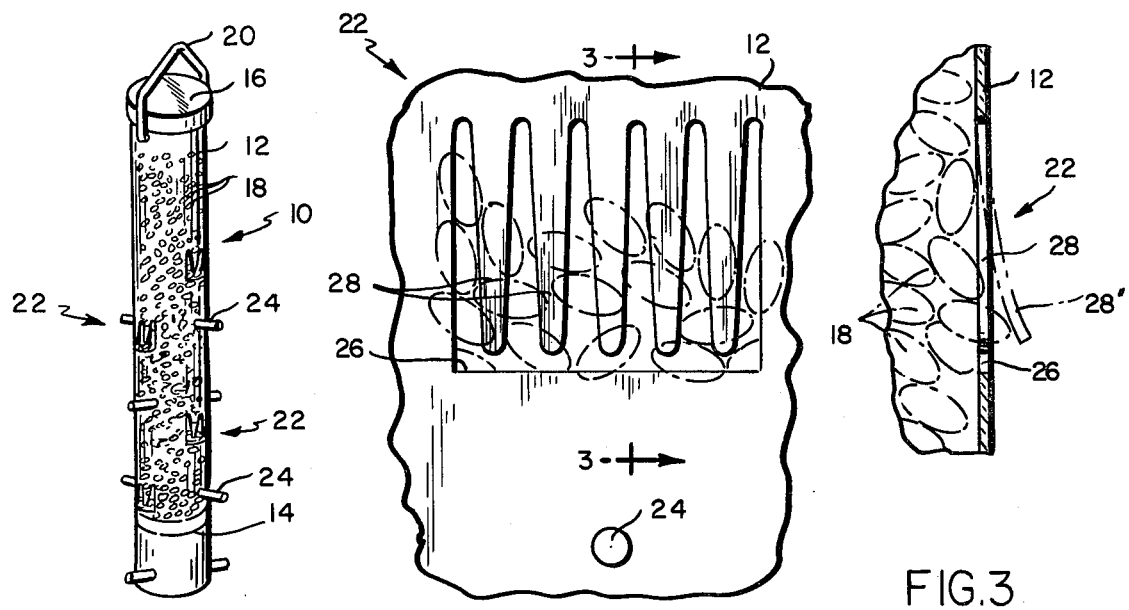
FIG. 1 is a perspective view of a bird feeder in accordance with the present invention.
FIG. 2 is a front elevational view on an enlarged scale of one of the feeding ports of the bird feeder shown in FIG. 1.
FIG. 3 is a sectional view taken along line 3—3 of FIG. 2.

Referring initially to FIG. 1, there is shown at 10 a bird feeder in accordance with the present invention. The bird feeder 10 has a side wall 12 closed at its lower end by a bottom wall 14, and having a removable cap 16 at its upper end. The side wall 12, bottom wall 14 and cap 16 cooperate in defining an interior compartment for the storage of seeds or other like feeding material indicated typically at 18. The side wall 12 is preferably a tubular transparent plastic extrusion. Alternatively, however, other materials, either opaque or transparent, as well as other cross-sectional configurations, are also possible. A wire bail 20 is provided at the upper end of the feeder for suspension purposes, and the side wall 12 is further provided with a plurality of feeding ports generally indicated at 22, each having an underlying exterior perch 24 on which birds may alight in order to extract sseds from the ports.

As can be better seen by additional references to FIGS. 2 and 3, each feeding port 22 comprises an opening 26 in the side wall 12, which opening is partially occluded by a plurality of mutually spaced finger members 28. The opening 26 is cut directly into the side wall 12, and the finger members 28 are also formed integrally with and of the same material as the side wall. This material is selected to provide the fingers with sufficient strength so that they can remain essentially parallel with the side wall and thus prevent the free flowing escape of seeds 18 from the interior storage compartment. By the same token, however, the finger members 28 have sufficient inherent resiliency so that if seeds are grasped by birds and forcibly extracted, the finger members will flex outwardly as shown by the dot-dash lines at 28' in FIG. 3. The spacing between the finger members is selected to suit particular seed types and sizes.

Thus is will be seen that during non-feeding intervals, the seeds 18 will be retained in the storage compartment by the finger members 28. However those seeds resting against the interior surfaces of the finger members will be accessible through the spaces between the finger members, and once grasped, such seeds may be forcibly extracted with an accompanying momentary outward resilient deflection of the finger members.

The finger members 28 can be die cut along with the opening 26, thus providing a low cost arrangement which is susceptable to mass production techniques.

Figures 4, 5:
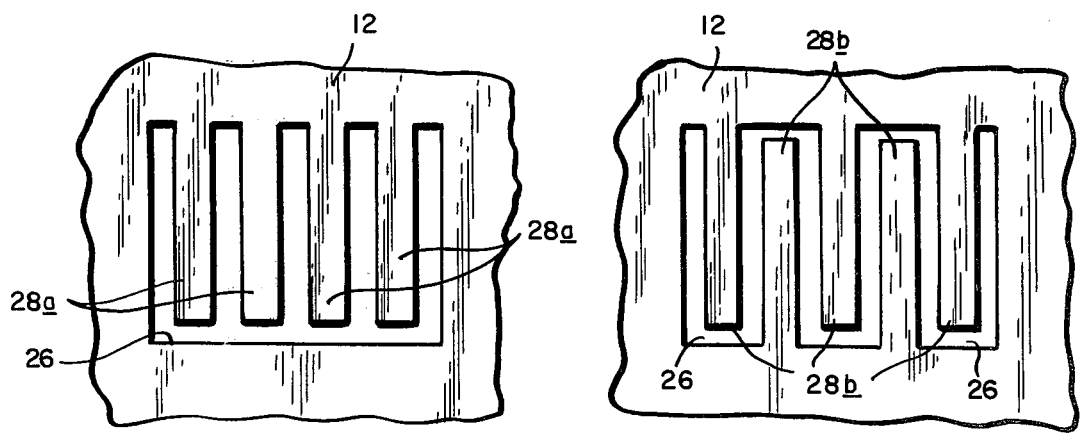
FIGS. 4, 5 and 6 are front elevational views of alternate embodiments of feeding ports in accordance with the present invention.

The finger members can take on any one of a number of configurations and arrangements. For example, FIG. 4 shows finger members 28a having rectangular rather than pointed shapes. FIG. 5 shows rectangular finger members 28b protruding into the opening 26 from opposite sides, rather than from the same side as shown in FIGS. 1-4. The number of finger members may vary, and under certain conditions, single finger members may be employed in place of the multiple fingers illustrated in the accompanying drawings.

Figures 6, 7:
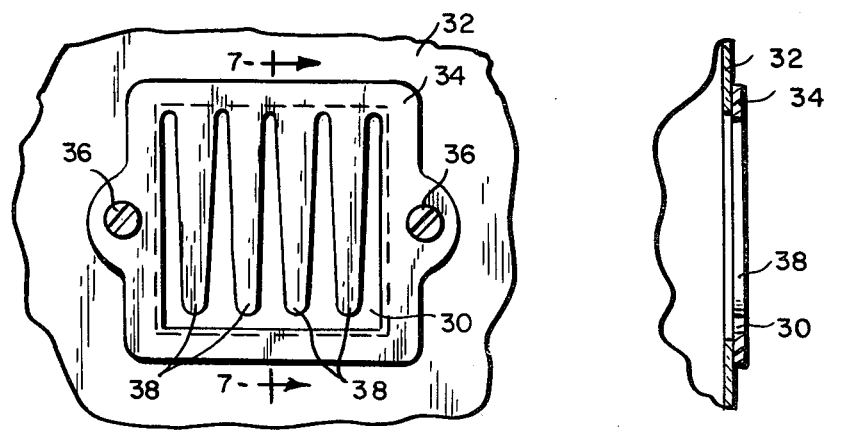
FIG. 7 is a sectional view taken along line 7—7 of FIG. 6

There may be situations where the feeder wall is fabricated of a material which for some reason is not susceptible to having finger members formed integrally therewith. Should this be the case, then as shown in FIGS. 6 and 7, a plain opening 30 can be cut into the side wall 32, and an attachment such as for example a rectangular frame 34 then secured as at 36 to the side wall. The frame can be of an appropriately resilient material with integral finger members 38 arranged to partially occlude the opening 30 in the same manner as shown in the embodiments of FIGS. 1-5.

I claim:

1. A bird feeder having a seed storage compartment at least partialy defined by a side wall, and an improved feeding port through which birds may extract seeds from said compartment, said port comprising an opening in said side wall, resilient finger means coextensive with said side wall and extending across said opening to partially occlude the same, said finger means being arranged to prevent a free flowing escape of seeds from said compartment through said opening and being flexible to accommodate forcible extraction of seeds from said compartment through said opening.

2. The bird feeder of claim 1 wherein said finger means are formed integrally with said side wall.

3. The bird feeder of claim 1 wherein said finger meams are pointed.

4. A bird feeder having a seed storage compartment at least partially defined by a side wall, and an improved feeding port through which birds may extract seeds from said compartments, said port comprising an opening in said side wall, resilient finger means formed as part of an attachment secured to said side wall adjacent to said opening, said finger means being arranged to partially occlude said opening and to prevent a free flowing escape of seeds from said compartment through said opening, said finger means being flexible to accommodate forcible extraction of seeds from said compartment through said opening.

5. The bird feeder of claims 2 or 3 wherein said finger means protrude across said opening from one edge thereof.

6. The bird feeder of claims 2 or 3 wherein said finger members protrude across said opening from opposite edges thereof.

7. The bird feeder of claim 3 wherein said attachment comprises a frame surrounding said opening.

8. A bird feeder comprising:
an upstanding cylindrical transparent plastic side wall closed at its lower end by bottom wall and having a removable cap at its upper end, said side wall, bottom wall and cap cooperating to define a seed storage compartment;
a plurality of feeding ports in said side wall, each of said feeding ports being partially occluded by a plurality of mutually spaced resilient finger members formed integrally with and coextensive with said side wall, said finger members being arranged to retain seeds in said compartment and being flexibly movable to accommodate forced extraction of seeds from said compartment through said ports.

* * * * *